United States Patent
Yuasa et al.

(10) Patent No.: US 7,824,807 B2
(45) Date of Patent: Nov. 2, 2010

(54) POSITIVE ELECTRODE MATERIAL FOR LITHIUM SECONDARY BATTERY AND LITHIUM SECONDARY BATTERY

(75) Inventors: Toyotaka Yuasa, Hitachi (JP); Masahiro Kasai, Mito (JP); Sai Ogawa, Tokai (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 1177 days.

(21) Appl. No.: 11/296,302

(22) Filed: Dec. 8, 2005

(65) Prior Publication Data

US 2006/0141361 A1 Jun. 29, 2006

(30) Foreign Application Priority Data

Dec. 10, 2004 (JP) ............................. 2004-357501

(51) Int. Cl.
H01M 4/62 (2006.01)
H01M 4/58 (2006.01)

(52) U.S. Cl. ............... 429/232; 429/231.1; 429/231.95; 429/231.8; 252/182.1

(58) Field of Classification Search ............ 429/231.95, 429/231.3, 212, 215, 231.1, 232, 231.8, 209, 429/128, 223, 224; 252/182.1
See application file for complete search history.

(56) References Cited

U.S. PATENT DOCUMENTS

2002/0172867 A1 * 11/2002 Anglin ....................... 429/232

| 2004/0253516 A1 | 12/2004 | Yuasa et al. |
| 2005/0142442 A1 | 6/2005 | Yuasa et al. |

FOREIGN PATENT DOCUMENTS

| CN | 1232438 A | 10/1999 |
| JP | 07-014573 | 1/1995 |
| JP | 11-176446 | 7/1999 |
| JP | 11-345607 | 12/1999 |
| JP | 2000-294240 | 10/2000 |
| JP | 2000-323142 | * 11/2000 |
| JP | 2000-340227 | 12/2000 |
| JP | 2002-151076 | 5/2002 |
| JP | 2003-086174 | 3/2003 |
| JP | 2004-220911 | 8/2004 |
| WO | WO 98/06670 | 2/1998 |

* cited by examiner

Primary Examiner—Raymond Alejandro
(74) Attorney, Agent, or Firm—Antonelli, Terry, Stout & Kraus, LLP.

(57) ABSTRACT

A positive electrode material for lithium secondary battery having high electron conductivity even at very low temperatures and a lithium secondary battery with the use of the positive electrode material are provided. The positive electrode material for lithium secondary battery has secondary particles formed of primary particles made of lithium complex oxides composited with ultrathin carbon fibers having lengths equal to or smaller than the diameters of the secondary particles of the positive electrode active material. The ultrathin carbon fibers have opposite ends from which an electrolytic solution moves in and out.

9 Claims, 3 Drawing Sheets

POSITIVE ELECTRODE MATERIAL FOR LITHIUM SECONDARY BATTERY AND LITHIUM SECONDARY BATTERY

FIELD OF THE INVENTION

The present invention relates to a novel positive electrode material for lithium secondary battery, a production method thereof, and a lithium secondary battery with the use of the positive electrode material, and particularly to a positive electrode material for large lithium secondary battery with the use of a nonaqueous electrolytic solution, a production method thereof, and a large lithium secondary battery with the use of the positive electrode material.

BACKGROUND OF THE INVENTION

In consideration of the environment, a high power battery with high energy density is demanded as a power source for a hybrid car that can use energy efficiently. Since lithium secondary batteries with the use of nonaqueous electrolytic solution are high in battery voltage and high in energy density, these are promising as a battery for use in automobile. When a lithium battery is used as a secondary battery for automobile, excellent input-output characteristics, operational stability in a wide range of temperature, and long life characteristics are demanded. For improvement of the input-output characteristics, optimization of electrode structure by enhancing electron conductivity in an electrode is being studied. On the other hand, for widening of the range of operational temperature, the development of functional electrolytic solution in which a decrease in lithium ion transport characteristics at low temperatures is suppressed is in progress. Further, for longer lasting life, the development of lamellar positive electrode active material that keeps a stable crystal structure even after undergoing charge and discharge cycles and a long period of storage is in progress.

The structure of a positive electrode sheet formed of a conductive material and a positive electrode active material is closely related to input-output characteristics of the battery. Generally, the conductive material is uniformly dispersed in the positive electrode sheet to form a conductive network, and the electrode resistance is lowered, thus obtaining a high power battery. Until now, it has been attempted to add various powder graphite in a positive electrode as a conductive carbon material.

In JP-A No. 14582/1995, it is shown that electrode resistance is lowered by using carbon nanotubes having high electron conductivity as a conductive material for a positive electrode.

The function that is necessary for the conductive material used in a positive electrode includes a liquid retention property of keeping an electrolytic solution in the vicinity of a positive electrode active material. When discharge is performed in a short time, lithium ion has to be instantly supplied from the electrolytic solution present in the vicinity of the positive electrode active material, and therefore, the conductive material retains the electrolytic solution in its micropores. In conductive materials such as carbon black, the electrolytic solution or lithium ion can easily move in and out of the end face of lamellar carbon.

On the other hand, in order to decrease the internal resistance of the electrode to a significant degree, it is necessary to form a conductive network among particles of the positive electrode active material, and long carbon nanotubes that can interconnect the particles of the positive electrode active material are required. Generally, the diameters of primary particles of the positive electrode active material used in a lithium battery are from submicron to several microns, and there are spaces of about several micrometers among the primary particles. Thus, carbon nanotubes having a length of about several micrometers are necessary for formation of the conductive network among the particles of the positive electrode active material. In other words, when carbon nanotubes are used in the positive electrode for lithium battery, there are lengths of carbon nanotubes that are suitable for moving-in and moving-out of the electrolytic solution or lithium ion and for the formation of the conductive network in the positive electrode active material.

However, carbon nanotubes are made of a carbon material having a cylindrical structure, and therefore, the electrolytic solution or lithium ion can move in and out only from both ends of the nanotubes. Accordingly, it is necessary that a shearing force is applied to the carbon nanotubes to cleave the tubes partially, thereby increasing opening portions. However, carbon nanotubes having a diameter smaller than 10 nm are cut in this process, giving rise to a shorter average length. It has not been disclosed in JP-A No. 14582/1995 that the formation of conductive network in the positive electrode active material and the liquid retention property of keeping the electrolytic solution were both fulfilled at the same time.

On the other hand, it is disclosed in JP-A No. 323142/2000 that the electrode resistance of a positive electrode is reduced by the use of a fibrous carbon material such as vapor growth carbon fiber (VGCF) as the conductive material. Since fibrous carbon material such as VGCF has a diameter larger than 100 nm, it is difficult to shear the fibrous carbon material. Accordingly, it is hard to mix and disperse the fibrous carbon material that has once aggregated and become clumpy in a positive electrode active material. When the aggregated fibrous carbon material and the positive electrode active material are mixed with each other and then slurry is prepared by adding an organic binder and an organic solvent to make an electrode coated with this slurry, the aggregated fibrous carbon material having high liquid absorbability absorbs the organic solvent and the binder locally in the electrode, thereby forming an ununiform electrode.

Further, it is disclosed in JP-A No. 86174/2003 that a complex particles attached with a carbon material on the surface of a positive electrode active material are prepared by mixing the positive electrode active material with 0.5 to 6% by weight of the carbon material having a BET specific surface area equal to or larger than 29 $m^2/g$ and that the use of these particles can fulfill both of the reduction in the resistance of an electrode and the retention of discharge capacity. When the mixing ratio of the carbon material is 6%. by weight or higher, the discharge capacity is decreased.

SUMMARY OF THE INVENTION

As described above, high power lithium secondary batteries need improvement in electron conductivity of the electrode in order to reduce the electrode resistance even at very low temperatures. However, none of the above-mentioned patent documents has disclosed at all the reduction of electrode resistance at very low temperatures.

The objects of the present invention are to provide a positive electrode material for lithium secondary battery having high electron conductivity even at very low temperatures, a production method thereof, and a lithium secondary battery with the use of the positive electrode material.

A feature of the positive electrode material for lithium secondary battery according to the present invention is that a positive electrode active material having secondary particles formed of primary particles made of lithium complex oxides and ultrathin carbon fibers having lengths equal to or smaller than the diameters of the secondary particles of the positive electrode active material are composited. Preferably, the lengths of ultrathin carbon fibers are equal to or longer than the diameters of the primary particles.

In the positive electrode material for lithium secondary battery of the present invention, it is preferred that a positive electrode active material composed of lamellar complex oxides represented by a chemical formula $Li_aMO_2$ ($0<a\leq1.2$; M represents at least one of Co, Ni, and Mn) and carbon fibers having a diameter of 10 to 100 nm are composited or that a positive electrode active material composed of lamellar complex oxides represented by a chemical formula $Li_aMn_xNi_yCo_zO_2$ ($0<a\leq1.2$; $01\leq x\leq0.9$; $0.1\leq y\leq0.44$; $0.1\leq z\leq0.6$; $x+y+z=1$) and carbon fibers having a diameter of 10 to 50 nm are composited.

In order to improve the electron conductivity of an electrode, it is necessary to form a conductive network that exerts excellent electron conductivity in the electrode. In the present invention, in particles of the positive electrode active material formed of the secondary particles that are derived from aggregation of the primary particles, the particles of the positive electrode active material and the carbon fibers are composited in order to form the conductive network among the primary particles. By interlinking the primary particles forming the particles of the positive electrode active material with one another by the carbon fibers, electrons are conducted to the primary particles isolated in the secondary particles of the positive electrode active material, thereby improving the electron conductivity of the whole secondary particles of the positive electrode active material.

The positive electrode active material of the present invention is preferred to be complex oxides containing Li and at least one of Mn, Ni, and Co. Generally, a positive electrode material suitable for high rate discharge is desired to have a high specific surface area in order to increase the area for reaction with an electrolytic solution. The positive electrode active material having a high specific area is preferably formed of the secondary particles having a particle structure in which a plurality of the primary particles are aggregated and bound to one another, and more preferably, the secondary particles are globular. The positive electrode active material becomes high in the specific surface area due to the primary particles with small diameters. As the result, the area for reaction of the electrolytic solution with the positive electrode active material is increased, thereby allowing a high rate of discharge.

However, when the boundary surface increases in the secondary particles of the positive electrode active material in which the primary particles are aggregated, a problem arises that the electron conductivity in the secondary particles is decreased due to the resistance of the boundary surface. For this reason, it becomes important that a conductive network in the secondary particles of the positive electrode active material is formed by enhancing the electron conductivity among the primary particles forming the secondary particles of the positive electrode active material.

Generally, carbon materials such as a lump of carbon black having a diameter of several tens of micrometers have been used to form a conductive network among the particles of the positive electrode active material at the positive electrode. However, in order to enhance the electron conductivity by interlinking individual primary particles forming the secondary particles of the positive electrode active material with one another by the use of this carbon material, almost all of the surfaces of the secondary particles are covered with the carbon material. As the result, the interface between the positive electrode active material and the electrolytic solution is decreased, thus making it difficult to realize high rate discharge. As described above, both of the increase in the boundary surfaces of the particles of the positive electrode active material and the formation of the conductive network need to be fulfilled for high rate discharge.

Accordingly, the present inventors focused attention on carbon fibers to form the conductive network among the particles of the positive electrode active material. As long as the carbon fibers are thin in diameter and high in aspect ratio, the electron conductivity can be enhanced by interlinking individual primary particles forming the particles of the positive electrode active material with one another without decreasing the area for reaction of the particles of the positive electrode active material with the electrolytic solution. The formation of the conductive network among the particles of the positive electrode active material was carried out by the following process in which the carbon fibers were dispersed among the particles of the positive electrode active material.

A feature of the method of producing the positive electrode material for lithium secondary battery according to the present invention is that the time of mixing of the positive electrode active material having the secondary particles formed of the primary particles made of Li complex oxides with ultrathin carbon fibers on a centrifugal ball mill is adjusted so that the ultrathin carbon fibers are fragmented to lengths equal to or smaller than the diameters of the particles of the secondary particles while mixing on the ball mill. Particularly, it is desirable that a liquid having lithium powder or lithium compound powder and metal oxide powder other than lithium is granulated and dried by a spray dryer and then the secondary particles are formed by sintering in the air.

By the way, when two pieces of carbon fibers having a diameter of approximately several tens of nanometers get close to each other, the attractive force exerted over the whole length of the carbon fibers becomes very large due to Van der Waals interaction, and therefore, the carbon fibers tend to form a randomly aggregated bundle. Once bundled, the carbon fibers present within the bundle can not interact with external molecules because they are covered with other carbon fibers, thus giving rise to considerable disadvantage in dispersing the carbon fibers. Therefore, disentangling of the bundle of the carbon fibers becomes essential for dispersion of the carbon fibers among the particles of the positive electrode active material. Accordingly, the carbon fiber powder and the particle powder of the positive electrode active material are put in a ball mill and mixed while applying a shear force to fragment the carbon fibers. When the time of mixing in this dispersion process is prolonged, the bundles of the carbon fibers are not only disentangled but also fragmented by shearing to have a predetermined length of the carbon fibers. At the same time, these are dispersed uniformly on the particle surfaces of the positive electrode active material activated by mechanical effect, and soon compact coating layers are locally formed on the particles of the positive electrode active material. However, excessively prolonged dispersion process is likely to disintegrate the particles of the positive electrode active material and reduce the electron conductivity of the positive electrode active material. For this reason, there is an adequate treatment time for the process of dispersing the carbon fibers onto the surfaces of the positive electrode active material.

As described above, the carbon fibers not only contribute to high rate discharge by forming the conductive network among the particles of the positive electrode active material but also retain an electrolytic solution in the vicinity of the particles of the positive electrode active material by absorbing the electrolytic solution and supply the electrolytic solution to the particles of the positive electrode active material at the time of high rate discharge. Therefore, it is desirable that the carbon fibers are prone to in-and-out of the electrolytic solution. In the carbon fibers having a high aspect ratio that form the conductive network among the particles of the positive electrode active material, however, the electrolytic solution moves in and out only from both ends of the fibers. Thus, it is necessary that the carbon fibers are cut by a shearing force to increase the number of the end portions so as to make the in-and-out of the electrolytic solution easy. As described above, there are appropriate thickness, length, and dispersion state of the carbon fibers that are suitable for the particles of the positive electrode active material in order to form the conductive network among the particles of the positive electrode active material as well as allow the carbon fibers to retain the electrolytic solution.

In the present invention, preferably the carbon fibers having a diameter from 10 to 50 nm and a length of 3 to 10 μm are used for such a state. When the diameter of the carbon fibers exceeds 50 nm, the coating ratio of the particles of the positive electrode active material increases, resulting in certain inhibition of the reaction of the positive electrode active material with the electrolytic solution. On the other hand, when the diameter of the carbon fibers is smaller than 10 nm, the carbon fibers are fragmented by the dispersion process of the carbon fibers to be changed to lengths shorter than 1 μm, which makes it somewhat difficult to interlink the primary particles of the positive electrode active material with one another.

In a structure of the particles of the positive electrode active material that are capable of forming a conductive network and suitable for highly efficient discharge, it is desired that the secondary particles of the positive electrode active material are formed by aggregation of the primary particles having an average particle diameter of 0.1 to 3 μm and a specific surface area larger than 1 $m^2/g$ and further that pores between the primary particles are 0.1 to smaller than 1 μm to interlink individual primary particles with one another by the carbon fibers. Furthermore, in view of retaining the electrolytic solution in the vicinity of the primary particles of the positive electrode active material, the cumulative amount of mercury penetrating into the pores that is determined by pore distribution measurement according to a mercury press-in method is desired to be from 0.1 to 0.3 ml/g. In addition, since the carbon fibers are dispersed by a ball mill, the shape of the secondary particles of the positive electrode active material is desired to be a globular shape similarly to the media of the ball mill. The ball mill is preferred to be a centrifugal ball mill, and the ball is preferred to be made of ceramics, particularly agate.

On the other hand, the particles of the positive electrode active material having an average primary particle diameter smaller than 0.1 μm are difficult in handling industrially. Further, since the crystal volume of the positive electrode active material expands and shrinks with charge and discharge, the pore diameter between the primary particles is desired to be equal to or larger than 0.1 μm. In addition, a positive electrode material that shows minimum expansion and shrinkage of the crystal volume due to charge and discharge is preferred to be used for particles of complex positive electrode material, because the pore diameter between the primary particles is small. When the cost of a lithium secondary battery is considered, it is desirable that the content of Co is small, and the positive electrode active material that fulfills a low cost as well as minimum expansion and shrinkage of the crystal volume is desired to be lamellar complex oxides represented by a chemical formula $Li_aMn_xNi_yCo_zO_2$ ($0<a\leq1.2$; $0.1\leq x\leq0.9$; $0.1\leq y\leq0.44$; $0.1\leq z\leq0.6$; $x+y+z=1$).

When the carbon fibers are added to the particles of the positive electrode active material, there is a close relationship between the addition amount and the dispersion state. As a method for evaluating the distribution state of the carbon fibers in the positive electrode active material, a powder analysis with the use of a particle analyzer (Horiba Ltd.: Model DP-1000) that performs an elemental analysis of a powder particle using plasma emission spectroscopy can be listed. In this analytical technique, one piece of the powder particle is directly introduced into plasma, elemental species are identified by spectrometry, and emission times of the elements are measured. At this time, elements in an attached state emit at the same time, while elements in a free state emit at different times. The carbon fibers adhering to the positive electrode active material can be quantitated by this analytical technique. A volume proportion of the carbon fibers composited with the particles of the positive electrode active material is desired to be higher than 50% with respect to the total carbon fibers added.

In the complex positive electrode material that decreases the internal battery resistance according to the present invention, the addition amount of the carbon fibers relative to the positive electrode active material is desirable to be higher than 6% by weight and lower than 10% by weight. When this complex positive electrode material was analyzed by the above powder analysis method, the volume proportion of the carbon fibers composited with the particles of the positive electrode active material relative to the total volume of the carbon fibers added was higher than 70%. When the addition amount of the carbon fibers is less than the above amount, the formation of conductive network among the particles of the positive electrode active material is insufficient, and the internal battery resistance is not sufficiently reduced. When the addition amount is more than the above, the carbon fibers aggregate during the time of coating of the complex positive electrode material, making it difficult to obtain an excellent coating film.

As described above, the present invention discloses the characteristics of the particles of the positive electrode active material and the carbon fibers to form efficiently a conductive network among the particles of the positive electrode active material and the method for forming a conductive network by dispersing the carbon fibers among the particles of the positive electrode active material. By combining these, a complex positive electrode material effective for reducing electrode resistance has been found.

On the other hand, a negative electrode material that can be used includes materials that can adsorb and release lithium such as metal lithium, lithium alloys (for example, LiAl, LiPb, LiSn, LiBi, and LiCd), conductive polymers doped with lithium ion (for example, polyacetylene and polypyrrole), intercalation compounds with lithium ion trapped inside the crystal (for example, compounds containing lithium between the layers of $TiS_2$, $MoS_2$, or the like), carbon materials capable of being doped/dedoped with lithium, and intermetallic compounds such as silicides, and metal oxides.

For the electrolytic solution, an aprotic organic electrolytic solution dissolved in an organic solvent with a lithium salt as an electrolyte is used. As the organic solvent, esters, ethers, 3-substituted 2-oxazolidinones, and mixed solvents of two or more of these solvents, or the like are used. Specifically, the esters include alkylene carbonate (ethylene carbonate, propylene carbonate, γ-butyrolactone, 2-methyl-γ-butyrolactone, and the like) and the like, or open-chain dimethyl carbonate, diethyl carbonate, ethylmethyl carbonate, and the like.

The ethers include diethyl ether, dimethoxyethane, and cyclic ethers, for example, ethers having 5-membered ring such as tetrahydrofuran, its substituted derivatives, and dioxolane, and ethers having 6-membered ring such as 1,4-dioxolane, pyran, dihydropyran, and tetrahydropyran.

The electrolyte that can be used includes lithium perchlorate, lithium borofluoride, lithium chloroaluminate, lithium halide, lithium trifluoromethanesulfonate, $LiPF_6$, $LiAsF_6$, and $LiB(C_6H_5)_4$, and among them, lithium phosphofluoride, lithium borofluoride, and lithium perchlorate are particularly preferred.

According to the present invention, a positive electrode material for lithium secondary battery having high electron conductivity even at very low temperatures, a production method thereof, and a lithium secondary battery with the use of the positive electrode material are provided.

DETAILED DESCRIPTION OF THE PREFERRED EMBODIMENTS

Figure 1:
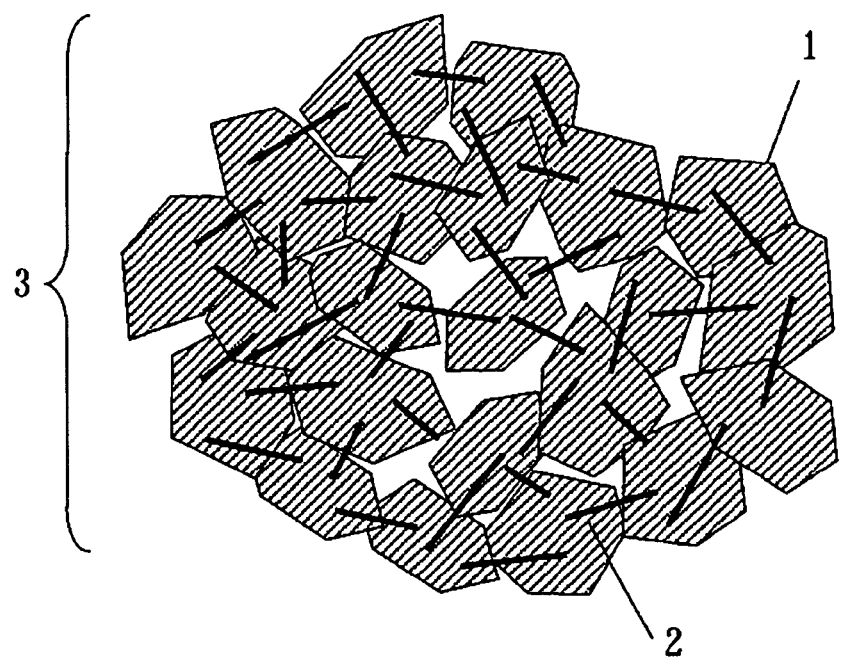
FIG. 1 is a schematic diagram explaining the surface of particles of a complex positive electrode material of the preset invention.

Hereinafter, best mode for carrying out the present invention will be explained by means of the following specific examples.

EXAMPLES

Example 1

As raw materials, manganese dioxide, cobalt oxide, nickel oxide, and lithium carbonate were used. These materials were weighed at atomic ratios of Ni:Mn:Co of 1:1:1 and Li:(NiMnCo) of 1.03:1, respectively, and after addition of pure water, pulverized and mixed by a wet process for 5 to 100 hours with a ball mill that makes use of a resin pot and zirconia balls to produce particles with submicron diameters. Then, a solution of polyvinyl alcohol (PVA) was added to the mixed liquid at 2% by weight calculated in terms of the ratio of solid content, mixed for further one hour, and granulated and dried by way of forming predetermined liquid droplets with a spray dryer to prepare particles of 5 to 30 μm. These particles were converted to crystals of lamellar structure by sintering for 3 to 10 hours at 1,000 degrees C. in the air, and then ground to obtain a positive electrode active material (1). After removing coarse particles having a particle diameter larger than 30 μm by classification of the positive electrode active material, it was used for electrode preparation.

Table 1 shows properties of positive electrode active materials (a) and (b) that were prepared by controlling primary particle diameters of raw powder by pulverization time and a positive electrode active material (c) that was prepared by setting sintering time for positive electrode active material to three hours.

TABLE 1

| | Positive electrode active material | | | Carbon fiber | | | Electrode |
|---|---|---|---|---|---|---|---|
| No. | | Average diameter of primary particles (μm) | Cumulative amount of mercury penetrating into pores (0.1-1 m) (ml/g) | | Diameter (nm) | Average length (μm) | resistance at −30° C. (Ω) |
| (1) | (a) | 3 | 0.2 | (a) | 40 | 1 | 140 |
| (2) | (a) | 3 | 0.2 | (b) | 40 | 2 | 130 |
| (3) | (a) | 3 | 0.2 | (c) | 40 | 3 | 110 |
| (4) | (a) | 3 | 0.2 | (d) | 40 | 5 | 115 |
| (5) | (a) | 3 | 0.2 | (e) | 40 | 10 | 142 |
| (6) | (a) | 3 | 0.2 | (f) | 10 | 3 | 135 |
| (7) | (a) | 3 | 0.2 | (g) | 30 | 3 | 110 |
| (8) | (a) | 3 | 0.2 | (h) | 50 | 3 | 111 |
| (9) | (a) | 3 | 0.2 | (i) | 150 | 3 | 145 |
| (10) | (b) | 4 | 0.2 | (a) | 40 | 1 | 150 |
| (11) | (b) | 4 | 0.2 | (b) | 40 | 2 | 149 |
| (12) | (b) | 4 | 0.2 | (c) | 40 | 3 | 148 |
| (13) | (b) | 4 | 0.2 | (d) | 40 | 5 | 149 |
| (14) | (b) | 4 | 0.2 | (e) | 40 | 10 | 152 |
| (15) | (b) | 4 | 0.2 | (f) | 10 | 3 | 149 |
| (16) | (b) | 4 | 0.2 | (g) | 30 | 3 | 150 |
| (17) | (b) | 4 | 0.2 | (h) | 50 | 3 | 149 |
| (18) | (b) | 4 | 0.2 | (i) | 150 | 3 | 155 |
| (19) | (c) | 1 | 0.05 | (a) | 40 | 1 | 138 |
| (20) | (c) | 1 | 0.05 | (b) | 40 | 2 | 137 |
| (21) | (c) | 1 | 0.05 | (c) | 40 | 3 | 137 |
| (22) | (c) | 1 | 0.05 | (d) | 40 | 5 | 135 |
| (23) | (c) | 1 | 0.05 | (e) | 40 | 10 | 143 |
| (24) | (c) | 1 | 0.05 | (f) | 10 | 3 | 137 |
| (25) | (c) | 1 | 0.05 | (g) | 30 | 3 | 137 |

TABLE 1-continued

| | | Positive electrode active material | | Carbon fiber | | Electrode |
| | | Average diameter of primary particles (μm) | Cumulative amount of mercury penetrating into pores (0.1-1 m) (ml/g) | | Diameter (nm) | Average length (μm) | resistance at −30° C. (Ω) |
| No. | | | | | | | |
| --- | --- | --- | --- | --- | --- | --- | --- |
| (26) | (c) | 1 | 0.05 | (h) | 50 | 3 | 137 |
| (27) | (c) | 1 | 0.05 | (i) | 150 | 3 | 141 |

As summarized in Table 1, various complex positive electrode materials were obtained by adding carbon fibers having an average diameter of 10 to 150 nm and an average length of 1 to 10 μm at an addition amount of 3.0 to 10% by weight with respect to powders of the positive electrode active materials (a) to (c), followed by mixing for 1 to 8 hours with a centrifugal ball mill. The centrifugal ball mill had a pot rotatable per se on a rotatable upright table, and the powder of a positive electrode active material, carbon fibers, and agate balls having a common diameter were put in the pot, followed by mixing at a predetermined rotation. Although the carbon fibers were ultrathin, relatively long, and tangled to one another in a fluffy state, they were fragmented and converted to a length comparable to an average particle diameter of the primary particle diameters by adjusting the time of mixing by the ball mill. The average particle diameters of the primary particles were 3.0 μm, 4.0 μm, and 1.0 μm for the powders of the positive electrode active materials (a), (b), and (c), respectively.

When a complex positive electrode material that was obtained by adding carbon fibers having an average diameter of 30 to 50 nm and an average length of 2 to 5 μm at an addition amount of 6.1 to 7% by weight to the powder of the positive electrode active material (a) was observed by an electron microscope, the carbon fibers were dispersed on the surface of the positive electrode active material.

FIG. 1 is a schematic diagram showing the surface of the complex positive electrode material of the preset invention. As shown in FIG. 1, carbon fibers 2 are fragmented into appropriate lengths by the centrifugal ball mill and are present so as to link primary particles 1 forming a secondary particle 3 of positive electrode active material to one another, thereby allowing contribution to improvement of electron conductivity among particles of the positive electrode active material. The carbon fibers 2 are dispersed among the primary particles 1 by having their lengths comparable to the particle diameters of the primary particles 1 of the positive electrode active material, thereby allowing the primary particles to be linked to one another. Accordingly, fragmentation of the carbon fibers 2 into predetermined lengths is necessary, and it is desirable that the lengths are shorter than those of the particle diameters of the secondary particles of the positive electrode active material.

The dispersibility of the carbon fibers of the obtained complex positive electrode material was measured by the following method using a particle analyzer manufactured by Horiba Ltd. First, 1 mg of the complex positive electrode material was dispersed on a membrane filter, and then one piece of the particle of the complex positive electrode material on the filter was sucked by an aspirator to introduce into plasma. Elemental species of the complex positive electrode material were identified by emission spectrometry at this time, and elements emitting at the same time and elements emitting at different times were estimated to be adhering elements and free elements, respectively. The result obtained by measuring about 4,000 pieces of the particles showed that 50% of the total volume of the carbon fibers added was adhered to the positive electrode active material to form the complex positive electrode material.

The distribution of pore diameters in the complex positive electrode material was measured by the following method. After the complex positive electrode material was dried beforehand in vacuum for 2 hours at 120 degrees C., the powder was put in a measurement cell and measured under a condition of initial pressure of 7 kPa. In pore distribution of the complex positive electrode material, the cumulative amount of mercury penetrating into pores of 0.1 to 1 μm diameter corresponding to interspaces between the primary particles of the positive electrode active material resulted in 0.1 to 0.3 ml/g. Further, the cumulative amount of mercury penetrating into pores of 10 to 50 nm diameter originating in the carbon fibers was 0.01 to 0.05 ml/g.

Next, a positive electrode plate to evaluate the properties of the complex positive electrode material was prepared by the following procedures. A solution in which a binding agent was dissolved in advance in a solvent, N-methyl-2-pyrrolidinone (hereinafter, referred to as NMP), the complex positive electrode material, and a carbon conductive material were homogeneously mixed to prepare a slurry of a positive electrode composition material. At this time, the complex positive electrode material, the carbon conductive material, and the binding agent were mixed in a proportion of 86:9.7:4.3 on weight basis. This slurry was uniformly coated on one surface of an aluminum foil collector having a thickness of 20 μm, dried at 100 degrees C., and pressed at 1.5 ton/square centimeter by a press to form a coated film having a thickness of about 40 μm.

With the use of an electrode prepared by punching this positive electrode plate with a diameter of 15 mm, a test battery whose negative electrode was a lithium electrode made of metallic lithium was prepared. For the electrolytic solution, a mixed solvent of ethyl carbonate (hereinafter, referred to as EC), dimethyl carbonate (hereinafter, referred to as DMC), and diethyl carbonate (hereinafter, referred to as DEC) in which 1.0 molar $LiPF_6$ was added as an electrolyte was used.

In the first place, evaluation of the internal battery resistance of the test battery was carried out by the following procedures. The battery was charged by constant current/constant voltage up to 4.2 V at a charge rate of 0.25 C, and then cooled down to −30 degrees C. After 5 hours, it was discharged at a discharge rate of 0.5 C, and the internal battery resistance was determined 10 seconds after starting the discharge.

Figure 2:
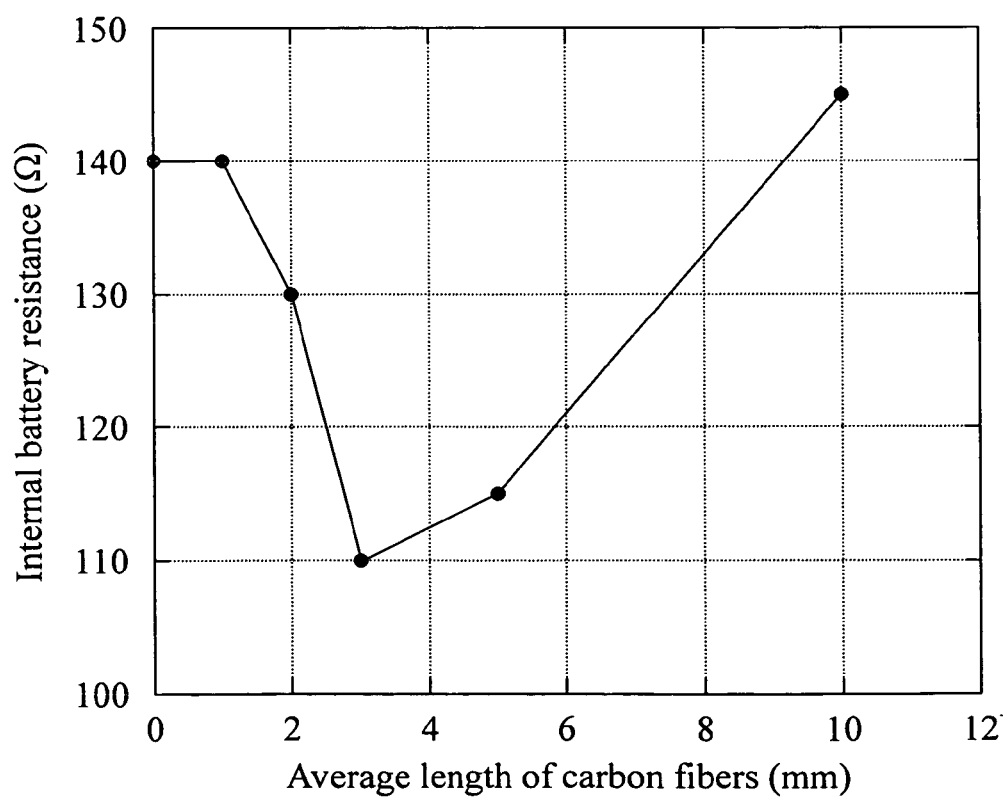
FIG. 2 is a chart showing a relation between the length of carbon fiber and internal battery resistance.

FIG. 2 is a chart showing a relation between the internal battery resistance at −30 degrees C. and the length of carbon fibers. In a test battery using the complex positive electrode material (3) in which carbon fibers (c) having an average diameter of 40 nm and an average length of 3 μm were added to the positive electrode active material (a) and mixed by using the ball mill, the internal battery resistance at −30 degrees C. was 110Ω as shown in FIG. 2 and was lowered significantly. On the other hand, in a test battery in which only the positive electrode active material without adding carbon fibers or carbon fibers having an average length of 1 μm (No. 2) or 10 μm (No. 5) were used, the internal battery resistance was higher than 140Ω. The internal battery resistance using the complex positive electrode made by adding these carbon fibers was high in both cases. The internal resistance was lower than 130Ω in the case of carbon fibers having an average length of 2 to 8 μm, and the internal resistance was lower than 120Ω in the case of carbon fibers having an average length of 2.5 to 6 μm.

Figure 3:
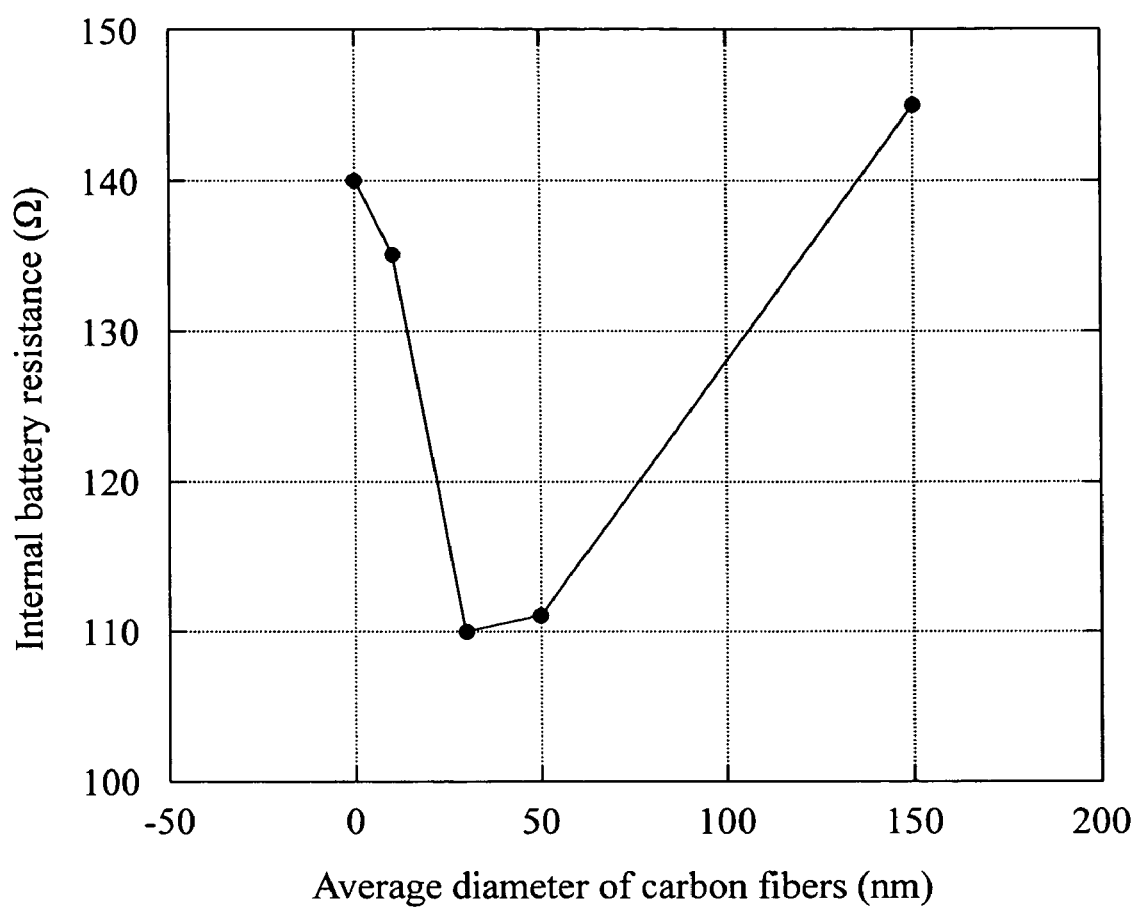
FIG. 3 is a chart showing a relation between the diameter of the carbon fiber and the internal battery resistance.

FIG. 3 is a chart showing a relation between the average diameter of the carbon fibers and the internal battery resistance. In a test battery using the complex positive electrode material (No. 7) added with carbon fibers (g) having an average diameter of 30 nm, the internal battery resistance was 110Ω. In a test battery using the complex positive electrode material (No. 8) added with carbon fibers (h) having an average diameter of 50 nm, the internal battery resistance was 111Ω. The internal resistance was lower than 130Ω when the complex positive electrode material added with carbon fibers having an average diameter of 15 to 110 nm was used, and the internal resistance was lower than 125Ω when carbon fibers having an average diameter of 20 to 85 nm were used.

Table 2 shows a relation between the addition amount of the carbon fibers and the internal battery resistance. The internal battery resistance was reduced by adding the carbon fibers to the positive electrode active material. When the amounts of the carbon fibers (g) were 6.1% by weight (No. 30) and 7.0% by weight (No. 31), the internal battery resistance was around 113Ω in either case and was lowered significantly. However, the positive electrode active material without carbon fibers (No. 28) or with carbon fibers at 10% by weight (No. 32) showed inversely a high internal battery resistance. When the addition amount of the carbon fibers was in the range of 4 to 9% by weight, the internal battery resistance lower than 125Ω was obtained.

TABLE 2

| | Positive electrode active material | | | |
|---|---|---|---|---|
| No. | Average diameter of primary particles (μm) | Cumulative amount of mercury penetrating into pores (0.1-1 m) (ml/g) | Addition amount of carbon fibers (c) (wt %) | Electrode resistance at −30° C. (Ω) |
| (28) | 1 | 0.2 | 0.0 | 140 |
| (29) | 1 | 0.2 | 3.0 | 138 |
| (30) | 1 | 0.2 | 6.1 | 110 |
| (31) | 1 | 0.2 | 7.0 | 113 |
| (32) | 1 | 0.2 | 10.0 | 150 |

In order to evaluate cycle life characteristics of the complex positive electrode material, a small cylindrical battery was made by the following procedures. A positive electrode plate that was obtained by coating a complex positive electrode material uniformly on both surfaces of an aluminum foil collector having a thickness of 20 μm in a manner similar to that described when the complex positive electrode material (3) was used was cut in a coating width of 5.4 cm and a coating length of 50 cm. A lead piece made of aluminum foil was welded for current draw out, thus completing preparation of a positive electrode plate.

Next, a negative electrode plate was made in order to prepare the small cylindrical battery in combination with this positive electrode plate. A slurry of a negative electrode composition material was prepared by dissolving pseudo-isotropic carbon (hereinafter, referred to PIC) that is amorphous carbon for negative electrode material in NMP containing a binding agent, followed by mixing. At this time, the ratio of the PIC material and the binding agent was adjusted to 92:8 on dry weight basis. This slurry was uniformly coated on both surfaces of rolled copper foil of 10 μm thickness. Then, it was pressed by a roll press, cut in a coating width of 5.6 cm and a coating length of 54 cm, and welded with a lead piece made of copper foil to prepare the negative electrode plate.

Figure 4:
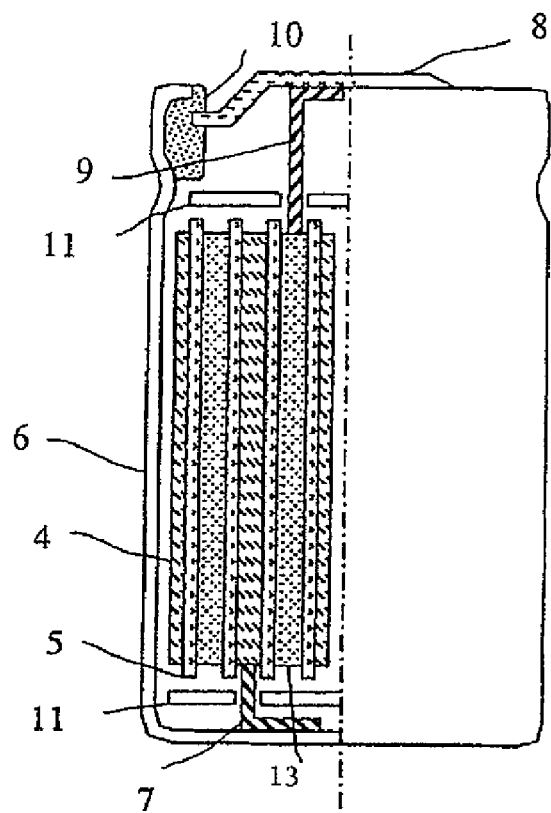
FIG. 4 is a front view with a partial cross sectional view showing a structure of a lithium ion secondary battery of the present invention.

FIG. 4 is a partial cross sectional view of the small cylindrical battery fabricated with the use of the prepared positive electrode plate and negative electrode plate. The cylindrical battery was fabricated by the following procedures. In the first place, a group of the electrodes was prepared by arranging separators 5 so as to wind between a positive electrode plate 13 and a negative electrode plate 4 one after another to prevent these electrodes from contacting directly with each other. At this time, a lead piece for positive electrode 9 and a lead piece for negative electrode 7 were arranged to be located opposite to each other on both end surfaces of the group of electrodes. Further, the positive electrode plates 13 and the negative electrode plates 4 were arranged such that the part coated with the positive electrode composition material did not protrude from the part coated with the negative electrode composition material. The separator 5 used here was porous polypropylene film having a thickness of 25 μm and a width of 5.8 cm. Next, the group of the electrodes was inserted into a battery can 6 made of SUS, and the lead piece 7 for the negative electrode was welded to the bottom of the can, while the lead piece 9 for the positive electrode was welded to a sealing cover portion 8 that also serves as a positive electrode current terminal. After a nonaqueous electrolytic solution (a solution of 1.0 mole/liter of $LiPF_6$ dissolved in a mixed solvent of EC, DMC, and DEC in a volume proportion of 1:1:1) was injected into the battery can 6 arranged with the group of the electrodes, packings 11 were attached on the top and bottom sides, respectively, and the battery can 6 was sealed by crimping the sealing cover portion 8 thereon to make the cylindrical battery having a diameter of 18 mm and a length of 65 mm. On the sealing cover portion 8, there is an open valve that opens to release the pressure inside the battery when it is elevated. The numeral 10 represents an insulating member.

The charge and discharge cycle properties of the fabricated battery were evaluated by setting a final charge voltage to 4.2 V and a final discharge voltage to 3.0 V at a discharge rate of 0.5 C. When a life test of 200 cycles was conducted on battery (1), the capacity retention rate was 87.5%, which was excellent.

In addition, a large cylindrical battery having a diameter of 40 mm and a length of 108 mm was fabricated by a fabrication method similar to that of the small cylindrical battery of the present example. The internal resistance of this battery was evaluated by the following procedures. The battery was charged by constant current/constant voltage up to 4.2 V at a charge rate of 0.25 C, and then cooled down to −30 degrees C. After 5 hours, it was discharged at a discharge rate of 0.5 C, and the internal battery resistance was determined. When the positive electrode material prepared according to the present example was used, the output energy density was 240 W/Kg to 600 W/kg in a state of a depth of discharge capacity of 50%.

According to the present example as described in the foregoing, a positive electrode material having high electron conductivity even at very low temperatures and a lithium secondary battery with the use of the positive electrode material can be provided.

Further, in the present example, a positive electrode material for lithium secondary battery improved in output characteristics and discharge capacity and a positive electrode for lithium secondary battery with the use of the positive electrode material can be obtained, and a large lithium secondary battery excellent in output characteristics and discharge capacity that makes use of a nonaqueous electrolytic solution can be provided.

Although the use of the lithium secondary battery of the present example is not particularly limited, it is suitable as a medium or high capacity power source for use in various industrial instruments. For example, the lithium secondary battery of the present example is suitable for electric car, light vehicle, hybrid car and rail-car that use both a power source driven by various engines and a power supplied by electric motor, and the like. Additional usage includes various medium capacity household electric appliances for general use and the like.

Comparative Example 1

Carbon fibers (a) having an average length of 1 μm shown in Table 1 was added to the same positive electrode active material (a) as that in the example 1 to prepare a complex positive electrode material (No. 1) according to the process disclosed in the example 1. When a test battery was made by using this complex positive electrode material and its internal battery resistance was evaluated in a manner similar to that in the example 1 (refer to FIG. 2), the internal battery resistance was 140Ω, which was the same as that when the positive electrode active material was used without adding carbon fibers.

Comparative Example 2

Carbon fibers (e) having an average length of 10 μm shown in Table 1 was added to the same positive electrode active material (a) as that in the example 1 to prepare a complex positive electrode material (No. 5) according to the process disclosed in the example 1. Using slurry in which this complex positive electrode material, a conductive material, a binding agent, and NMP are mixed together, a positive electrode plate was prepared. At this time, the dispersion of the complex positive electrode material and the conductive material became locally ununiform due to aggregates of the carbon fibers. When this test battery was made and its internal battery resistance was evaluated in a manner similar to that in the example 1 (refer to FIG. 2), the internal battery resistance was 142Ω, which was approximately the same as that when the positive electrode active material was used without adding carbon fibers.

Comparative Example 3

Carbon fibers (f) having a diameter of 10 nm shown in Table 1 was added to the same positive electrode active material (a) as that in the example 1 to prepare a complex positive electrode material (No. 6) according to the process disclosed in the example 1. When a test battery was made by using this complex positive electrode material and its internal battery resistance was evaluated in a manner similar to that in the example 1 (refer to FIG. 3), the internal battery resistance was 135Ω, which was approximately the same as that when the positive electrode active material was used without adding carbon fibers.

Comparative Example 4

Carbon fibers (i) having a diameter of 150 nm shown in Table 1 was added to the same positive electrode active material (a) as that in the example 1 to prepare a complex positive electrode material (No. 9) according to the process disclosed in the example 1. When a test battery was made by using this complex positive electrode material and its internal battery resistance was evaluated in a manner similar to that in the example 1 (refer to FIG. 3), the internal battery resistance was 145Ω, which was approximately the same as that when the positive electrode active material was used without adding carbon fibers.

Comparative Example 5

Carbon fibers (c) shown in Table 1 was added at 3% by weight to the same positive electrode active material (a) as that in the example 1 to prepare a complex positive electrode material (No. 29) according to the process disclosed in the example 1. When the distribution of pore diameters in this positive electrode active material was measured by the mercury press-in method, the cumulative amount of mercury penetrating into pores having 0.1 to 1 μm diameter was less than 0.1 ml/g, and the volume of pores having 10 to 50 nm diameter was less than 0.01 ml/g as the total pore volume.

When a test battery was made by using this complex positive electrode material and its internal battery resistance was evaluated in a manner similar to that in the example 1 (refer to Table 2), the internal battery resistance was 138Ω, which was approximately the same as that when the positive electrode active material was used without adding carbon fibers.

Comparative Example 6

Carbon fibers (c) shown in Table 1 was added at 10% by weight to the same positive electrode active material (a) as that in the example 1 to prepare the complex positive electrode material (No. 32) according to the process disclosed in the example 1. As a method for evaluating the distribution state of the carbon fibers in this complex positive electrode material, a powder analysis was carried out by the following way using the particle analyzer manufactured by Horiba, Ltd. First, 1 mg of the complex positive electrode material was dispersed on a membrane filter, and then one piece of the particle of the complex positive electrode material on the filter was sucked by an aspirator to introduce into plasma. Elemental species of the complex positive electrode material were identified by emission spectrometry at this time, and elements emitting at the same time and elements emitting at different times were estimated to be adhering elements and free elements, respectively. The result obtained by measuring about 4,000 pieces of the particles showed that 30% of the total volume of the carbon fibers added was adhered to the positive electrode active material to form the complex positive electrode material, whereas 70% of the total volume of the carbon fibers added was separated from the positive electrode active material.

Next, using slurry in which this complex positive electrode material, a conductive material, a binding agent, and NMP are mixed together, a positive electrode plate was prepared. At this time, the dispersion of the complex positive electrode material and the conductive material became locally ununiform due to aggregates of the carbon fibers. When this test battery was made and its internal battery resistance was evaluated in a manner similar to that in the example 1 (refer to Table 2), the internal battery resistance was 150Ω, which was approximately the same as that when the positive electrode active material was used without adding carbon fibers.

Comparative Example 7

With the use of the positive electrode active material (b) in which an average particle diameter of primary particles was 4 μm and carbon fibers (a) to (i) both of which were disclosed in the example 1, complex positive electrode materials (Nos. 10 to 18) were prepared in a manner similar to that in the example 1.

Figure 5:
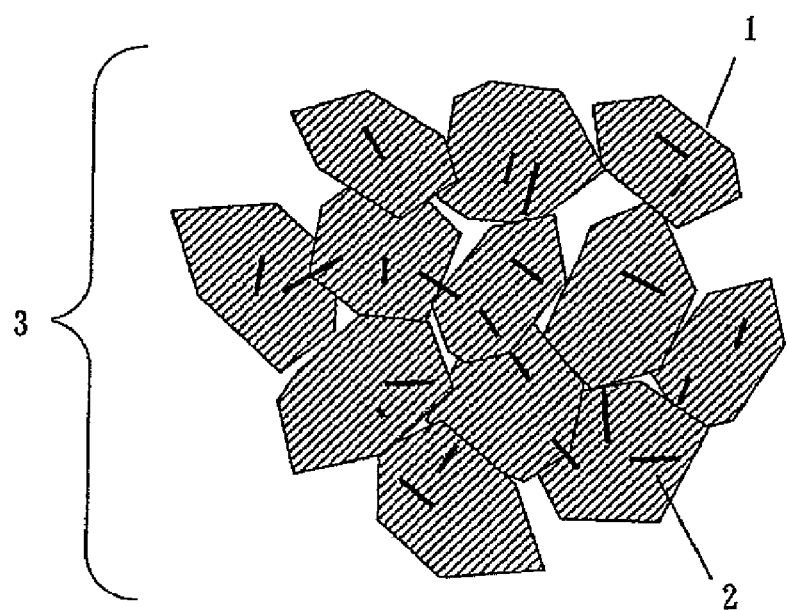
FIG. 5 is a schematic diagram explaining the surface of particles of a complex positive electrode material of a comparative example.

FIG. 5 is a schematic diagram showing a result of electron microscopic observation of the surfaces of these complex positive electrode materials. Carbon fibers present to interlink primary particles constituting secondary particles of the positive electrode active material with one another were fewer compared with the result of the example 1, thereby making it difficult to form an extensive conductive network in the secondary particles of the positive electrode active materials in contrast to the case in the example 1.

Next, using slurry in which each complex positive electrode material, a conductive material, a binding agent, and NMP were mixed together, a positive electrode plate was prepared. When carbon fibers (e) and (i) were used respectively in the complex positive electrode material, the electrode became locally ununiform due to aggregates of the carbon fibers. With other carbon fibers, uniform positive electrode plates could be prepared. When these test batteries were made and their internal battery resistances were evaluated in a manner similar to that in the example 1 (refer to Table 1), no reduction in the internal battery resistance was observed.

Comparative Example 8

With the use of the positive electrode active material (c) formed of primary particles having an average particle diameter of 1 μm and carbon fibers (a) to (i) both of which were disclosed in the example 1, complex positive electrode materials (Nos. 19 to 27) were prepared in a manner similar to that in the example 1. When the distribution of pore diameters of the particles of the positive electrode active material (c) was measured by the mercury press-in method, the cumulative amount of mercury penetrating into pores of 0.1 to 1 μm diameter was 0.05 ml/g, and the cumulative amount of mercury penetrating into pores of 1 to 10 μm diameter was 0.3 ml/g. Since sintering time of this positive electrode active material was short, pore diameters in the secondary particles were larger. When the surfaces of these complex positive electrode materials were observed by an electron microscope, the primary particles in the secondary particles could hardly be interlinked with one another by the carbon fibers because the pore diameters in the secondary particles were larger.

When test batteries were made using these complex positive electrode materials and their internal battery resistances were evaluated in a manner similar to that in the example 1 (refer to Table 1), their internal battery resistances were almost the same as that when the positive electrode active material was used without adding carbon fibers, and no effect of addition of carbon fibers was observed.

Example 2

In the present example, manganese dioxide, cobalt oxide, nickel oxide, and lithium carbonate were used as raw materials. These materials were weighed at atomic ratios of Ni:Mn:Co of 0.6:0.2:0.2 and Li:(NiMnCo) of 1.03:1, and after addition of pure water, pulverized and mixed by a wet process with the ball mill that made use of a resin pot and zirconia balls to produce particles with submicron particle diameters. A solution of polyvinyl alcohol (PVA) was added to the mixed liquid at 2% by weight calculated in terms of the ratio of solid content, mixed for further one hour, and granulated and dried by a spray dryer to prepare particles of 5 to 100 μm. These particles were converted to crystals of lamellar structure by sintering for 20 to 50 hours at 1,000 degrees C. in the air, and then ground to obtain a positive electrode active material. After removing coarse particles having a particle diameter larger than 50 μm by classification of the positive electrode active material, it was used for electrode preparation. By controlling the diameters of primary particles of raw powder by means of adjusting pulverization time, a sample having a particle structure similar to that of the positive electrode active material (a) in the example 1 was prepared.

Further, as in the case of the example 1, ultrathin and relatively long carbon fibers that are tangled with one another in a fluffy state were mixed with the positive electrode active material while being fragmented by the centrifugal ball mill to prepare a complex positive electrode material as in the example 1. When a test battery was made using the complex positive electrode material and its internal battery resistance was measured, an effect of reduction in the internal battery resistance was obtained with the use of the complex positive electrode material as in the case of the example 1.

Next, a small cylindrical battery was fabricated with the use of this complex positive electrode material in a manner similar to that in the example 1. The charge and discharge cycle properties of the fabricated battery were evaluated by setting a final charge voltage to 4.2 V and a final discharge voltage to 3.0 V at a discharge rate of 0.5 C. When a life test of 200 cycles was conducted on battery (1), the capacity retention rate was 78.1%, and the cycle life was somewhat shorter compared to when the positive electrode active material having the composition shown in the example 1 was used.

As described above, in the present example as well, a positive electrode material for lithium secondary battery that has high electron conductivity even at very low temperatures and is improved in output characteristics and discharge capacity and a positive electrode for lithium secondary battery with the use of the positive electrode material can be obtained, and a nonaqueous lithium secondary battery excellent in output characteristics and discharge capacity can be provided as in the case of the example 1. Further, the present example can also be applied to various uses similar to those described in the example 1.

What is claimed is:

1. A positive electrode material for a lithium secondary battery, comprising:
   a plurality of primary particles comprising lithium complex oxides, wherein an average particle diameter of the primary particles is 0.1 to 3.0 μm; and
   a plurality of ultrathin carbon fibers dispersed uniformly among the plurality of primary particles so that the primary particles are linked to one another to form a secondary particle wherein the ultrathin carbon fibers have a diameter of 10 to 50 nm, wherein the length of the ultrathin carbon fibers is from 2 to 8 μm, and the ultrathin carbon fibers are contained in the positive electrode material in an amount of 6 to 10% by weight;

wherein the ultrathin carbon fibers have opposite ends from which an electrolytic solution can move in and out, and have lengths equal to or smaller than a diameter of the secondary particle.

2. The positive electrode material for lithium secondary battery according to claim 1, wherein a cumulative amount of mercury penetrating into pores having diameters of 10 to 50 nm that is measured by a mercury press-in method is from 0.01 to 0.05 ml/g.

3. The positive electrode material for lithium secondary battery according to claim 1, wherein the cumulative amount of mercury penetrating into pores having diameters of 0.1 to 1μm that is measured by the mercury press-in method is from 0.1 to 0.3 ml/g.

4. The positive electrode material for lithium secondary battery according to claim 1, wherein a volume proportion of the carbon fibers composited with the positive electrode active material is equal to or higher than 50% relative to the total amount of carbon fibers added.

5. The positive electrode material for lithium secondary battery according to claim 1, wherein the positive electrode active material is composed of lamellar complex oxides represented by a chemical formula $Li_aMO_2$, where $0<a\leqq1.2$; M represents at least one of Co, Ni, and Mn.

6. The positive electrode material for lithium secondary battery according to claim 1, wherein the positive electrode active material is composed of lamellar complex oxides represented by a chemical formula $Li_aMn_xNi_yCo_zO_2$, where $0<a\leqq1.2$; $0.1\leqq x\leqq0.9$; $0.1\leqq y\leqq0.44$; $0.1\leqq z\leqq0.6$; $x+y+z=1$, and the diameter of the ultrathin carbon fibers is from 10 to 50 nm.

7. A positive electrode plate for lithium secondary battery, comprising a film of the positive electrode material for lithium secondary battery according to claim 1 formed on a metallic foil.

8. A lithium secondary battery comprising positive and negative electrodes via separator and an electrolytic solution, wherein the positive electrode comprises the positive electrode plate for lithium secondary battery according to claim 7.

9. The lithium secondary battery according to claim 8, wherein an output energy density is 240 to 600 W/kg in a state of a depth of discharge capacity of 50% at a temperature of −30 degrees C.

* * * * *